United States Patent
Riou et al.

(10) Patent No.: US 10,055,992 B2
(45) Date of Patent: Aug. 21, 2018

(54) METHOD FOR MANAGING PARKING SPACES ON PUBLIC STREETS

(71) Applicant: GEMALTO SA, Meudon (FR)

(72) Inventors: Mikael Riou, Meudon (FR); Francois-Xavier Marseille, Meudon (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 15/527,546

(22) PCT Filed: Oct. 30, 2015

(86) PCT No.: PCT/EP2015/075356
§ 371 (c)(1),
(2) Date: May 17, 2017

(87) PCT Pub. No.: WO2016/083077
PCT Pub. Date: Jun. 2, 2016

(65) Prior Publication Data
US 2018/0033301 A1 Feb. 1, 2018

(30) Foreign Application Priority Data

Nov. 25, 2014 (EP) .................................. 14306872

(51) Int. Cl.
*B60Q 1/48* (2006.01)
*G08G 1/14* (2006.01)
(Continued)

(52) U.S. Cl.
CPC ............ *G08G 1/144* (2013.01); *G08G 1/147* (2013.01); *H04W 12/02* (2013.01); *H04W 12/04* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 2008/0066186 A1* | 3/2008 | Hammes | ............. | B60R 25/2018 726/27 |
| 2009/0154706 A1* | 6/2009 | Lee | ........................... | H04L 9/32 380/278 |
| 2015/0345965 A1* | 12/2015 | Semsey | .................. | G07B 15/02 701/537 |

FOREIGN PATENT DOCUMENTS

| WO | WO2012119255 A1 | 9/2012 |
|---|---|---|
| WO | WO2014130195 A1 | 8/2014 |

OTHER PUBLICATIONS

PCT/EP2015/075356 International Search Report, dated Jan. 15, 2016, European Patent Office, P.B. 5818 Patentlaan 2 NL-2280 HV Rijswijk.

(Continued)

*Primary Examiner* — Travis Hunnings
(74) *Attorney, Agent, or Firm* — The Jansson Firm; Pehr B. Jansson

(57) ABSTRACT

The invention relates to a method for managing on-street parking spaces. The method includes querying, by a unit of a vehicle, vehicle sensors about the occupancy status of a parking space around the vehicle, the setting up of a communication channel between the unit and a remote server, the authentication of the unit with the server, the sending of a message with a public encryption key by the server to the unit, the encryption of the geolocation data and the occupancy status, the sending of the encrypted data to server, the decryption by the server of the received encrypted data, the comparison of the geolocation data received with a database (Continued)

containing referenced parking spaces and the update in the database of the occupancy status of referenced parking spaces.

11 Claims, 3 Drawing Sheets

(51) Int. Cl.
| | |
|---|---|
| *H04W 12/06* | (2009.01) |
| *H04W 12/04* | (2009.01) |
| *H04W 12/02* | (2009.01) |
| H04L 29/06 | (2006.01) |
| H04W 76/02 | (2009.01) |
| H04W 76/10 | (2018.01) |

(52) U.S. Cl.
CPC ......... *H04W 12/06* (2013.01); *H04L 63/0428* (2013.01); *H04L 2209/805* (2013.01); *H04L 2209/84* (2013.01); *H04W 76/02* (2013.01); *H04W 76/10* (2018.02)

(56) References Cited

OTHER PUBLICATIONS

PCT/EP2015/075356 Written Opinion of the International Searching Authority, Jan. 15, 2016, European Patent Office D-80298 Munich.

\* cited by examiner

METHOD FOR MANAGING PARKING SPACES ON PUBLIC STREETS

BACKGROUND

1. Field of the Invention

This invention relates to a method for the management of on-street parking spaces.

2. Description of the Related Art

In cities, the scarcity of available parking spaces, particularly on streets, is a permanent challenge and a source of concern for both local authorities and users.

In parking facilities such as underground car parks or multi-storey car parks, the improvement of parking management by equipping each parking space with a vehicle presence sensor is known.

Thus, at any time, the operator of the facility is aware of the exact occupancy status of each parking space and can guide users entering the facility towards empty spaces using appropriate signage means. That service is generally greatly appreciated by users.

However, the system cannot be transferred to on-street parking. That is because it would be too expensive to equip parking spaces with such occupancy or presence sensors. Further, an additional difficulty arises out of the fact that on-street parking spaces do not use specific infrastructure (connection to power supply, connection to communication systems) that allows the installation of a network of sensors for an acceptable cost. Also, the costs of maintaining and managing such a network would be very high.

Lastly, such sensors would be subjected to very severe climatic conditions that would make it necessary to protect them, for a cost that would be prohibitive.

In order to remedy that problem, the use of sensors already installed on vehicles to detect free on-street parking spaces has been proposed, for example in document DE 10 2012 222 810. Today, automobiles are increasingly equipped with sensors that are integrated into driver aid systems (parking assist, lane monitoring, lateral overtaking warning, automatic lamp switch-on systems etc.), such as for example front or rear cameras, radars, ultrasound sensors etc. These sensors use appropriate software to detect objects in the environment of the vehicle, particularly other vehicles.

Thus, for example, when a car parks in a parallel parking space, a vehicle sensor can detect if there is a vehicle in front of or behind the car, and thus if there are free parking spaces in the vicinity of the car that is being parked or is parked.

The information collected about unoccupied parking spaces is sent via a wireless communication interface to a central server. Then the server can be queried by users to find parking spaces when they arrive at their destinations.

However, that known system has a drawback: communication with the server is not secure, which leads to problems in terms of the protection of privacy and data theft. Indeed, the system as presented in document DE 10 2012 222 810 appears vulnerable to fraudulent manipulations aimed, for example, at claiming that a parking space is occupied, when in fact it is free. Such manoeuvres could be used to reserve one or more or even all spaces. For the operator in charge of managing on-street parking, that would represent a shortfall in revenue, as the system would not direct vehicles to that space or those spaces when queried.

SUMMARY OF THE INVENTION

One aim of this invention is thus to propose a more secure method for the management of on-street parking spaces.

To that end, the invention relates to a method for management of on-street parking spaces that comprising the following steps performed by a mobile unit installed in an automotive vehicle comprising outer ground occupancy sensors configured to provide the occupancy status of a parking space around the vehicle:

querying said outer ground occupancy sensors about the occupancy status of a parking space around the vehicle, setting up a communication channel with a remote server comprising a database containing the geographical data of referenced parking spaces, after authentication of the mobile unit by the remote server, encrypting the geolocation data of the parking space and occupancy status of the parking space with a public encryption key of the remote server, sending the encrypted geolocation data and its occupancy status to the remote server in a message, such that the remote server after decryption of the encrypted data received, compares the decrypted data with the geolocation data of referenced parking spaces contained in said database, and updating the referenced parking space occupancy data in the database.

The management process may further comprise one or more of the characteristics below, alone or in combination:

For example, the mobile unit may also comprise a database of referenced parking spaces and the querying step is initiated by the mobile unit when it is located in a referenced parking space.

In one aspect, at the authentication stage, the mobile unit sends a message encrypted with a public encryption key to the remote server. The public cryptographic key of the authentication message from the mobile unit to the remote server is for example generated using a key derived from a master key known to the remote server. That derived key may be unique to each mobile unit and is saved securely in the secure mobile element.

In another aspect, the mobile unit also sends encrypted geolocation data about the parking space in which the vehicle bearing the mobile unit is parked and its occupancy status.

In one embodiment, the mobile unit is put on standby when the vehicle is moving.

In one development, the mobile unit also sends a message with encrypted geolocation data about the parking space in which the vehicle is located when the vehicle moves away, indicating that a parking space has become free.

In another aspect, messages are sent and received between the mobile unit and the remote server by means of a telecommunications network, particularly a mobile telecommunications network.

Following a request for locating a free space, the remote server could for instance send a message to the mobile units in a targeted geographical area to update the occupancy status of the referenced parking spaces in the targeted geographical area.

In another aspect, the remote server updates the database of referenced parking spaces in the mobile unit when the mobile unit enters a predefined area that is not covered by the database.

The invention also relates to the mobile unit of a system for managing on-street parking spaces, where the system includes a remote server comprising a database containing referenced parking spaces, and where said mobile unit is designed to be installed in an automotive vehicle, characterised in that the mobile unit is configured to query one or more sensors of the vehicle to detect the occupancy status of a parking space around the vehicle, set up a communication channel with the remote server,
be authenticated by the remote server,
receive a message from the remote server containing a public encryption key,
encrypt the geolocation data of the parking space and its occupancy status,
send the encrypted geolocation data of the parking space and its occupancy status to a remote server in a message.

The mobile unit may have one or more of the characteristics below, alone or in combination:

The mobile unit may also comprise a database of referenced parking spaces and is set up to initiate the querying step when it is located in a referenced parking space (3).

The mobile unit is particularly set up to send a public cryptographic key to the remote server.

The mobile unit is for example set up to also send encrypted geolocation data about the parking space in which the vehicle bearing the mobile unit is parked and its occupancy status.

In one aspect, the mobile unit comprises a geolocation sensor and at least one accelerometer.

The mobile unit is to be set up to go into standby mode when the vehicle is moving.

In another aspect, the mobile unit is set up to send a message with encrypted geolocation data about the parking space in which the vehicle is located when the vehicle moves away, indicating that a space has become free.

The mobile unit particularly includes a telecommunications component to communicate on a telecommunications network.

That telecommunications component may comprise a smart card that saves the cryptographic key for authentication.

The invention also relates to a system for managing on-street parking spaces comprising a mobile unit as defined above, and a remote server comprising a database containing referenced parking spaces and set up to communicate with the mobile unit.

BRIEF DESCRIPTION OF THE DRAWINGS

Other benefits and characteristics will become clear in the description of the invention and the attached drawings in which.

DETAILED DESCRIPTION

In the figures, identical elements bear the same reference numbers.

In the description, some elements are referenced by numbers with indices. In that case, the index designates an individual element among different elements in a group.

The following embodiments are examples. Even though the description refers to one or more embodiments, that does not necessarily mean that each reference relates to the same embodiment or that the characteristics apply to only one embodiment. Simple characteristics of the different embodiments can also be combined to supply other embodiments.

Figure 1:
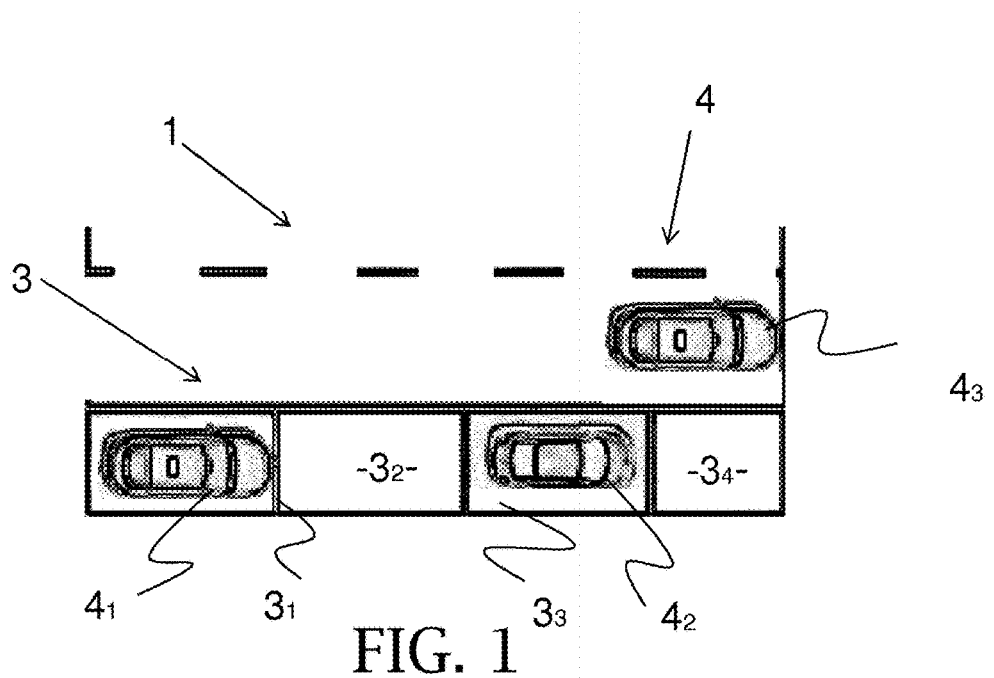
FIG. 1 is a skeleton diagram showing for example a standard traffic situation.

FIG. 1 shows a standard traffic situation with a road 1 lined with parallel parking spaces 3 ($3_1$, $3_2$, $3_3$ and $3_4$). These may be pay parking spaces or free parking spaces 3. These are parking spaces that are located on the street, that is to say this is not a private car park like an underground or multi-storey car park. These parking spaces 3 ($3_1$, $3_2$, $3_3$ and $3_4$) are referenced spaces, that is to say they are identified as such so as to potentially accommodate automotive vehicles for temporary parking. Such referencing of parking spaces 3 may be reflected for example by marking on the ground and the association of geolocation data with that space 3. That concept of referenced spaces is of some significance, in that for example, at the end of a row of parking spaces, there is generally space to park an automotive vehicle, but parking in these spaces is not permitted.

This figure also contains three automotive vehicles 4 ($4_1$, $4_2$ and $4_3$).

The automotive vehicles $4_1$ and $4_2$ occupy parking spaces $3_1$ and $3_3$ respectively. The parking spaces $3_2$ and $3_4$ are free and are ready to be occupied, for example by the automotive vehicle $4_3$ that is on the road 1 looking for a parking space.

Figure 2:
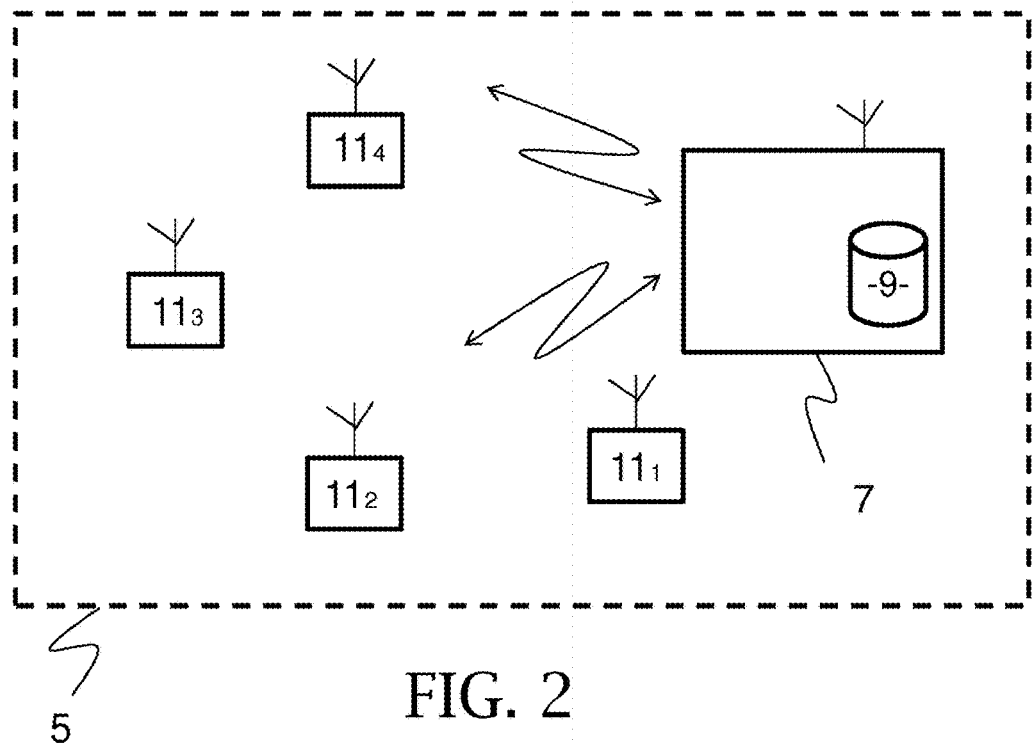
FIG. 2 is an operating diagram of a system according to the invention.

FIG. 2 shows an example of a system 5 for managing on-street parking spaces.

That system 5 firstly comprises a server 7 equipped with telecommunications means, for example via a mobile telephony network, and comprising a database 9 containing the geographical data of referenced parking spaces (geolocation data) and secondly at least one or preferably several mobile units 11 ($11_1$, $11_2$, $11_3$, $11_4$) installed in automotive vehicles, for example the vehicle $4_1$. 'Installed' firstly means that the mobile unit 11 is located in a vehicle when it is moving at least till the vehicle is parked and the driver has left the vehicle and secondly that the mobile unit 11 can communicate with the vehicle 4 particularly with its on-board computers, for example via a Bluetooth™ link. Thus, it may be a mobile telephone, a smartphone for example, loaded with software adapted to communicate with the automotive vehicle and particularly with the outer ground occupancy sensors of the vehicle such as ultrasound sensors, radars or cameras on the front, rear or side of the vehicle. In one alternative, the mobile unit 11 is installed permanently in the automotive vehicle and managed directly by the on-board computers of the vehicle 4 or integrated as a computer program in those on-board computers.

Figure 3:
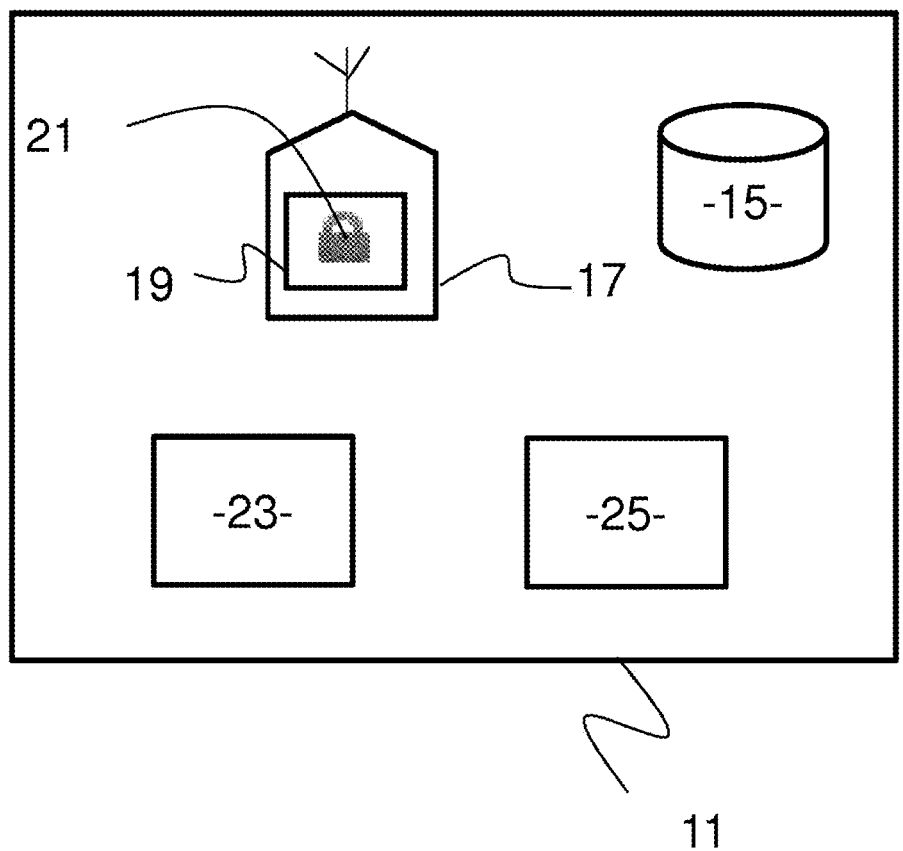
FIG. 3 is an operating diagram showing the mobile unit of the system and some of its components in greater detail.

FIG. 3 is a simplified diagram of the mobile unit 11. The unit also includes a database 15 of referenced parking spaces. That database 15 is valuable for indicating to the mobile unit 11 that the vehicle is being parked, in order, for instance, to initiate the querying of the vehicle occupancy sensor or sensors and/or communication with the server 7.

The mobile unit 11 also comprises a telecommunications component 17 to communicate with the remote server 7 through a telecommunications network, particularly a mobile telephony network.

The telecommunications component 17 particularly includes a smart card 19 containing a public cryptographic key 21 in one of its memories.

That public cryptographic key 21 is used by it to be authenticated with the remote server 7.

The mobile unit 11 can additionally include a geolocation sensor 23 to determine the geolocation data of free parking spaces and possibly additionally at least one accelerometer 25 to determine whether or not the vehicle 4 is immobile. The geolocation sensor may comprise a GPS (global positioning system) chip or an interface that allows triangulating the position of the mobile unit in relation to the relay antennas of the telecommunications network.

Even though that is not represented, it goes without saying that the different components of unit 11 are connected to each other and can exchange information or data.

Figure 4:
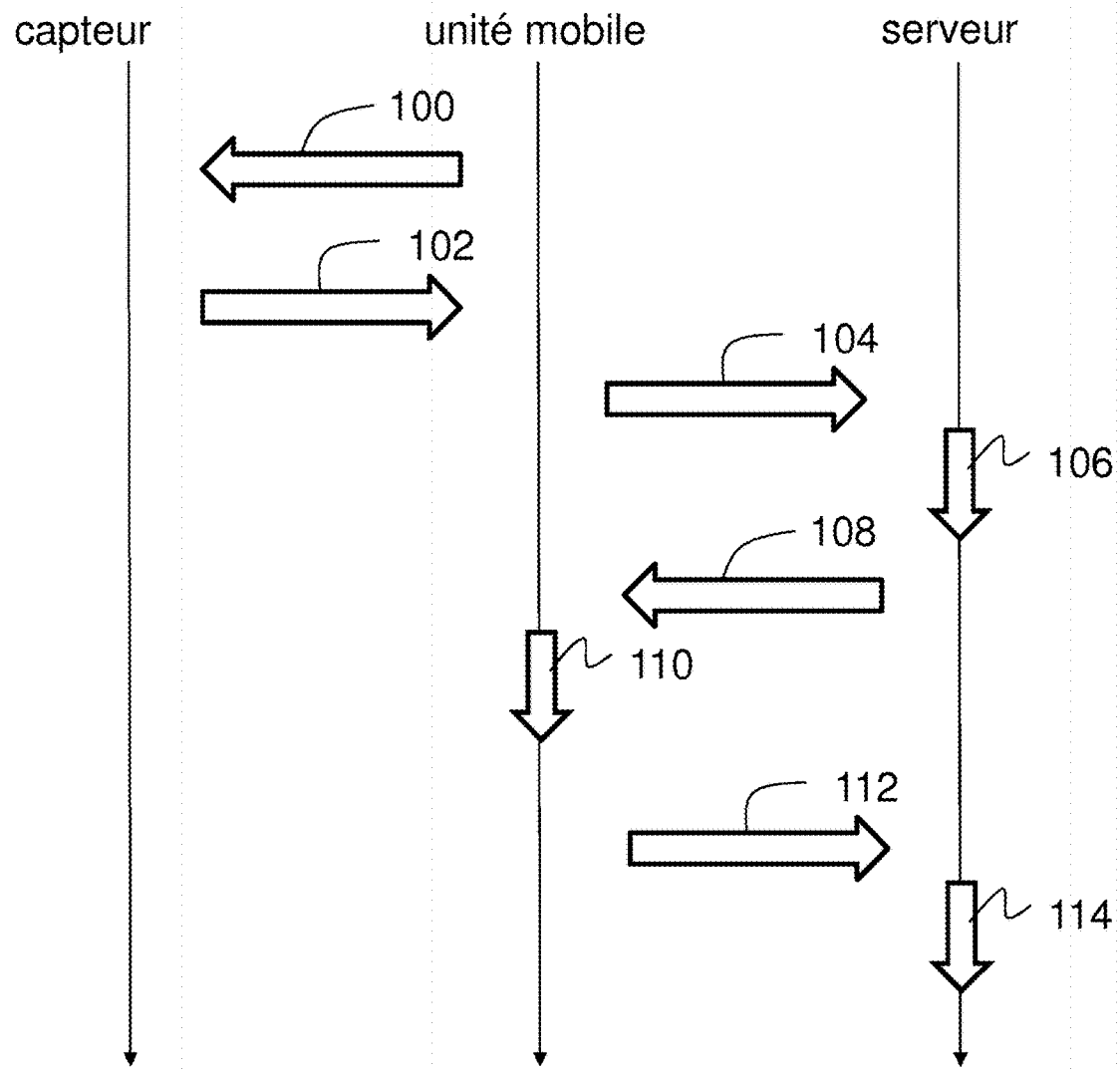
FIG. 4 is a skeleton diagram of the method according to the invention.

By reference to FIG. 4, an example of a method for managing on-street parking spaces will now be described.

In a first step 100, the mobile unit 11 queries one or more sensors of the vehicle to determine whether or not the space around the vehicle, particularly to the front, rear, left or right, is occupied, and thus the availability/occupancy status of a parking space 3 around the vehicle 4. As described above, these are sensors that detect occupancy of the ground around the vehicle 4 such as a front or rear camera or parking assist systems with their ultrasound sensors or radars.

In order to save power, the query is for instance only initiated when the mobile unit 11 and thus the vehicle 4 is located in a referenced parking space 3. Indeed, by locating the mobile unit 11 and thus the vehicle 4 in a referenced parking space, the driver's intention to park there is detected. It can also be inferred that there may be other parking spaces, for example before or behind the vehicle or possibly on the sides, depending on the location of parking spaces and choices.

Otherwise, if the space occupied by the vehicle 4 is not a referenced space, the information about a free space before or behind the vehicle is of little value, as one cannot know whether or not parking is allowed in it. Since the management system is aimed at informing drivers reliably about free spaces where parking is permitted, non-referenced spaces in which parking cannot be guaranteed if they are free cannot be taken into account.

That information about the occupancy status of the parking spaces 3 around the vehicle 4 is sent during a step 102 to the mobile unit $11_1$ of the vehicle $4_1$. In a step 104, the unit sets up a communication channel with the remote server 7 and is authenticated with the server, particularly by sending an authenticating public cryptographic key 21. In the authentication step, the mobile unit 11 sends a message encrypted with a public encryption key to the remote server 7. The public cryptographic key of the authentication message from the mobile unit 11 to the remote server 7 is for example generated using a key derived from a master key known to the remote server 7. That derived key may be unique to each mobile unit 11 and is saved securely in the secure mobile element 11. That further allows a check of the non-corruption of server 7. In one alternative, the communication channel could be only set up if a free parking space 3 is identified, for example parking space $3_2$ of FIG. 1.

In a step 106, the remote server 7 compares the public encryption key received with those saved in one of its memories to allow or reject communication.

If the authentication message is that of an authorised mobile unit 11, then the server 7 sends a message with a public encryption key to the mobile unit 11 in a step 108.

Then that public key of the server 7 is used by the mobile unit 11 to encrypt the geolocation data of the free parking space or spaces detected, in a step 110.

It may also be used to encrypt geolocation data of the parking space (here $3_1$) occupied by the vehicle 4 in which the mobile unit 11 is installed.

Then the mobile unit 11 sends in a step 112 a message with the encrypted geolocation data of the parking space and its occupancy status, and also possibly the occupied status of the parking space occupied by the vehicle $4_1$, to the remote server 7.

The remote server 7 then decrypts the data received in a step 114 and compares them with the geolocation data of referenced parking spaces contained in the database 9, then updates in the database the occupancy status (occupied or free) of parking spaces 3.

Thus, when a user, for example the driver of vehicle $4_3$ is looking for a free parking space 3, they can for instance query the remote server 7 via a smartphone with appropriate software and be guided to a free parking space $3_2$.

Communication between the mobile unit 11 and the server 7 is secure and encrypted, thus avoiding fraud, such as for instance indicating that a parking space is occupied when that is not so.

Such secure encrypted communication also makes it possible to prevent fraudulent use of geolocation data, for instance to track a vehicle.

Besides, thanks to the geolocation sensor and/or accelerometer, it is possible to know whether or not the vehicle is moving. If the vehicle is moving, the mobile unit 11 can be put on standby or in an idle status to save power, particularly if the mobile unit 11 has its own power supply, for instance in the form of a battery, particularly a battery that is rechargeable via a solar module or a USB™ stick.

Further, thanks to the geolocation sensor 23 and/or the accelerometer 25, the mobile unit 11 can send a message with encrypted geolocation data about the parking space in which the vehicle is located when the vehicle moves away, indicating that a space has become free.

In an envisaged development, after a request for locating a free parking space from a user, the remote server 7 could send a message to the mobile units 11 in a targeted geographical area to update the occupancy status of the referenced parking spaces 3.

The remote server 7 can update the database 15 of the referenced parking spaces 3 in the mobile unit 11 when it enters a predefined area that is not covered by the database 15 or after receiving a message containing the geolocation data of a free parking space 3.

The database 15 only contains geolocation data of parking spaces 3 in a limited area and is updated automatically when the vehicle moves out of the area. Thus, for example, the size of the database 15 and thus the memory space required in the mobile unit 11 can be reduced to cover for instance only one district of a city, a city or a region, without adversely affecting the system 5 when the mobile unit 11 is located outside the limited area of referenced parking spaces.

Of course, modifications may be made to the method described above without falling outside the scope of this invention.

Thus, the mobile unit 11 could also query the remote server 7 at regular intervals or the mobile unit 11 may be queried at regular intervals by the server 7.

That could allow the update in real time of the databases 9 or 15.

The invention claimed is:

1. A method for the management of on-street parking spaces comprising: the following steps performed by a mobile unit installed in an automotive vehicle comprising outer ground occupancy sensors configured to provide the occupancy status of a parking space around the vehicle:

querying said outer ground occupancy sensors about the occupancy status of a parking space around the vehicle, setting up a communication channel with a remote server comprising a database containing the geographical data of referenced parking spaces, after authentication of the mobile unit by the remote server, encrypting the geolocation data of the parking space and occupancy status of the parking space with a public encryption key of the remote server, sending the encrypted geolocation data and its occupancy status to the remote server in a message, such that the remote server to after decryption of the encrypted data received, compares the decrypted data with the geolocation data of referenced parking spaces contained in said database, and updating the referenced parking space occupancy data in the database.

2. The method according to claim 1, wherein the mobile unit also comprises a database of referenced parking spaces and the query step is initiated by the mobile unit when the mobile unit is located in a referenced parking space.

3. The method according to claim 1, wherein in the authentication stage, the mobile unit sends a message encrypted with a public encryption key to the remote server.

4. The method according to claim 1, wherein the mobile unit also sends encrypted geolocation data about the parking space in which the vehicle bearing the mobile unit is parked and its occupancy status.

5. The method according to claim 1, wherein mobile unit is put on standby when the vehicle is moving.

6. The method according to claim 1, wherein mobile unit also sends a message with encrypted geolocation data about the parking space in which the vehicle is located when the vehicle moves away, indicating that a parking space has become free.

7. The method according to claim 1, wherein messages are sent and received between the mobile unit and the remote server by means of a telecommunications network, particularly a mobile telecommunications network.

8. The method according to claim 1, wherein after a request for locating a free space, the remote server sends a message to the mobile units in a targeted geographical area to update the occupancy status of the referenced parking spaces in the targeted geographical area.

9. The method according to claim 1, wherein the remote server updates the database of referenced parking spaces in the mobile unit when the mobile unit enters a predefined area that is not covered by the database of the mobile unit.

10. A mobile unit of a system for managing on-street parking spaces, where the system includes a remote server having a database containing geographical data of referenced parking spaces, and where said mobile unit is designed to be installed in an automotive vehicle comprising outer ground occupancy sensors configured to provide the occupancy status of a parking space around the vehicle, the mobile unit is configured to:

query one or more outer ground occupancy sensors of the vehicle to detect the occupation status of a parking space around the vehicle, set up a communication channel with the remote server, be authenticated by the remote server, encrypt the geolocation data of the parking space and occupancy status of the parking space with a public encryption key of the remote server, send the encrypted geolocation data of the parking space and its occupancy status to a remote server in a message, such that the remote server after decryption of the encrypted data received, compares the decrypted data with the geographical data of referenced parking spaces contained in said database, and updates the referenced parking space occupancy data in the database.

11. A system for managing on-street parking spaces comprising at least one mobile unit and a remote server comprising a database containing geographical data of referenced parking spaces and set up to communicate with said at least one mobile unit where the mobile unit is designed to be installed in an automotive vehicle comprising outer ground occupancy sensors configured to provide the occupancy status of a parking space around the vehicle and the mobile unit is configured to:

query one or more outer ground occupancy sensors of the vehicle to detect the occupation status of a parking space around the vehicle, set up a communication channel with the remote server, be authenticated by the remote server, encrypt the geolocation data of the parking space and occupancy status of the parking space with a public encryption key of the remote server, send the encrypted geolocation data of the parking space and its occupancy status to a remote server in a message, such that the remote server after decryption of the encrypted data received, compares the decrypted data with the geographical data of referenced parking spaces contained in said database, and updates the referenced parking space occupancy data in the database.

* * * * *